United States Patent
Hatfield et al.

(10) Patent No.: US 8,639,876 B2
(45) Date of Patent: Jan. 28, 2014

(54) EXTENT ALLOCATION IN THINLY PROVISIONED STORAGE ENVIRONMENT

(75) Inventors: Brian D. Hatfield, Tucson, AZ (US); Kurt A. Lovrien, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 440 days.

(21) Appl. No.: 12/695,033

(22) Filed: Jan. 27, 2010

(65) Prior Publication Data

US 2011/0185147 A1  Jul. 28, 2011

(51) Int. Cl.
*G06F 12/00* (2006.01)

(52) U.S. Cl.
USPC ........... 711/111; 711/113; 711/117; 711/118; 711/170

(58) Field of Classification Search
None
See application file for complete search history.

(56) References Cited

U.S. PATENT DOCUMENTS

| | | | |
|---|---|---|---|
| 6,237,079 B1 | 5/2001 | Stoney | |
| 6,385,706 B1 | 5/2002 | Ofek et al. | |
| 6,591,334 B1* | 7/2003 | Shyam et al. | 711/112 |
| 6,697,846 B1 | 2/2004 | Soltis | |
| 6,718,436 B2 | 4/2004 | Kim et al. | |
| 6,816,945 B2 | 11/2004 | Harris et al. | |
| 7,107,385 B2 | 9/2006 | Rajan et al. | |
| 7,130,960 B1 | 10/2006 | Kano | |
| 7,562,203 B2 | 7/2009 | Scott et al. | |
| 7,650,341 B1 | 1/2010 | Oratovsky et al. | |
| 7,669,022 B2 | 2/2010 | Maruyama et al. | |
| 7,685,396 B2 | 3/2010 | Sze et al. | |
| 7,698,501 B1 | 4/2010 | Corbett et al. | |
| 7,702,870 B2 | 4/2010 | English et al. | |
| 7,725,651 B2 | 5/2010 | Saito | |
| 2005/0071388 A1* | 3/2005 | Fienblit et al. | 707/204 |
| 2006/0106891 A1 | 5/2006 | Mahar et al. | |
| 2007/0226447 A1* | 9/2007 | Shimozono et al. | 711/170 |
| 2007/0233992 A1 | 10/2007 | Sato | |
| 2007/0266037 A1 | 11/2007 | Terry et al. | |
| 2008/0320061 A1 | 12/2008 | Aszmann et al. | |
| 2009/0144496 A1 | 6/2009 | Kawaguchi | |
| 2009/0182959 A1 | 7/2009 | Rao | |
| 2009/0240880 A1 | 9/2009 | Kawaguchi | |
| 2009/0271412 A1 | 10/2009 | Lacapra et al. | |
| 2009/0271418 A1 | 10/2009 | Vaghani et al. | |
| 2010/0042802 A1 | 2/2010 | Helman et al. | |
| 2010/0077173 A1 | 3/2010 | Rao et al. | |
| 2010/0082774 A1 | 4/2010 | Pitts | |

FOREIGN PATENT DOCUMENTS

WO   2008006674 A1   1/2008

OTHER PUBLICATIONS

"Check Point Copy for a Two Stage Store," www.ip.com, IP.com No. IPCOM000089366D, Mar. 4, 2005, 5 pages.

U.S. Appl. No. 12/859,134, entitled "Methods and Systems for Formatting Storage Volumes," filed Aug. 18, 2010, 34 pages.

(Continued)

*Primary Examiner* — Matthew Bradley
*Assistant Examiner* — Daniel Tsui
(74) *Attorney, Agent, or Firm* — Griffiths & Seaton PLLC (57) ABSTRACT

Method, apparatus, and computer program product embodiment for allocating a plurality of extents in a thinly provisioned computing storage environment are provided. In one such embodiment, subsequent to a write request and previous to entering a cache of the computing storage environment, a determination is made, for a logical extent, whether a real extent is available. Pursuant to determining the availability of the real extent, the logical extent is allocated to the real extent by updating system metadata associated with the logical extent.

14 Claims, 4 Drawing Sheets

(56) References Cited

OTHER PUBLICATIONS

U.S. Appl. No. 12/859,137, entitled "Methods and Systems for Releasing and Re-Allocating Storage Segments in a Storage Volume," filed Aug. 18, 2010, 24 pages.

Greenan et al.; "Reliability Mechanisms for File Systems Using Non-Volatile Memory as a Metadata Store"; ACM Digital Library; pp. 178-188; Oct. 2006.

Caudill et al.; "Tuning File System Block Addressing for Performance"; ACM Digital Library; pp. 7-20; Mar. 2006.

* cited by examiner

EXTENT ALLOCATION IN THINLY PROVISIONED STORAGE ENVIRONMENT

BACKGROUND OF THE INVENTION

1. Field of the Invention

The present invention relates in general to computers, and more particularly to apparatus, method and computer program product embodiments for allocating extents in a thinly provisioned computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To achieve greater storage performance and reliability for customers, a variety of improvements to storage environments continue to be made. The so-called "thin provisioning" paradigm has become common in enterprise data processing systems. Thin provisioning allows administrators to configure logical storage units, such as volumes, without "real" or physically allocated storage behind them. "Real" storage is then allocated on demand. The allocation of the storage is performed by control units in the data processing system in chunks of data referred to as extents, or contiguous areas of storage on a computer file system. Extents may vary in size, but are generally constant within a given control unit.

One method for accommodating extent allocation in thinly provisioned storage environments is to allocate the extents on demand the first time a track of storage is destaged (e.g., moved from cache to disk) to a particular extent. Extent allocations are kept in system-wide metadata. In general, an allocation should be hardened (e.g., the allocation metadata successfully destaged) prior to destaging the underlying customer data that triggered the allocation. This ensures that the underlying data is not moved to non-volatile media without accompanying metadata indicating to which logical storage unit to which the underlying data belongs. Additional improvements may be made, however, in extent allocations in thinly provisioned storage environments to increase storage performance and efficiency and reduce and prevent timeouts such as missing interrupt handlers (MIH).

In view of the foregoing, method, system, and computer program product embodiment for allocating a plurality of extents in a thinly provisioned computing storage environment are provided. In one such embodiment, by way of example only, subsequent to a write request and previous to entering a cache of the computing storage environment, a determination is made, for a logical extent, whether a real extent is available. Pursuant to determining the availability of the real extent, the logical extent is allocated to the real extent by updating system metadata associated with the logical extent.

Additional system and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for improved allocation of extents in a thinly provisioned computing storage environment. These mechanisms allow volatile extent allocations to be initiated at a host write time (prior to entering cache), after which allocations are completed a host computer is called back. Non-volatile extent allocations may then be initiated after the volatile allocations complete. Both volatile and non-volatile extent allocations are completed in advance of the underlying data being destaged.

Instead of allocating logical extents at a destage time (such as previously described), the illustrated embodiments attempt to perform extent allocations at a host write time. Those allocations to which there is no physical space available are rejected by the system prior to consuming cache or non-volatile storage (NVS) (such as battery or firehose dump-backed memories). This functionality avoids the problem of consuming cache and valuable NVS space with modified data that cannot be destaged due to a lack of available space in an associated storage pool.

Finally, the illustrated embodiments accomplish time consuming destage operations using background cycles. These operations are performed in lieu of extending either associated host write commands or data destage paths with inline harden operations. In this manner, hardening operations (to destage allocation metadata, for example) are deferred to the background in lieu of serialization of the hardening in the foreground.

Throughout the following, terminology such as "real" extents and "logical" extents are used, and are intended to refer to herein as follows. A "real" extent corresponds to a physical data structure, such as a physical, contiguous portion of a file on a computer storage medium, for example. A "logical" extent corresponds to a virtualized data structure, which may in turn then correspond to a "real," physical extent. One of ordinary skill in the art will appreciate the differences between these terminologies as will be further described.

Figure 1:
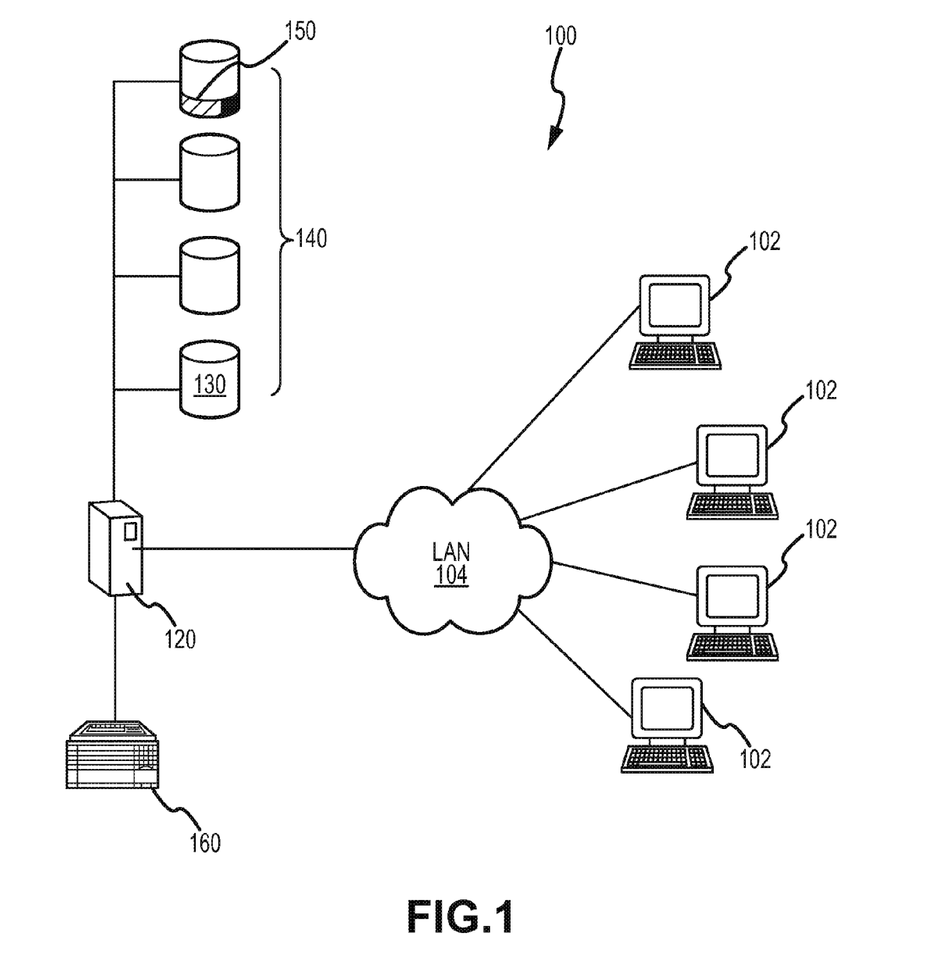
FIG. 1 illustrates an exemplary computer network in the form of a local area network.
Figure 2:
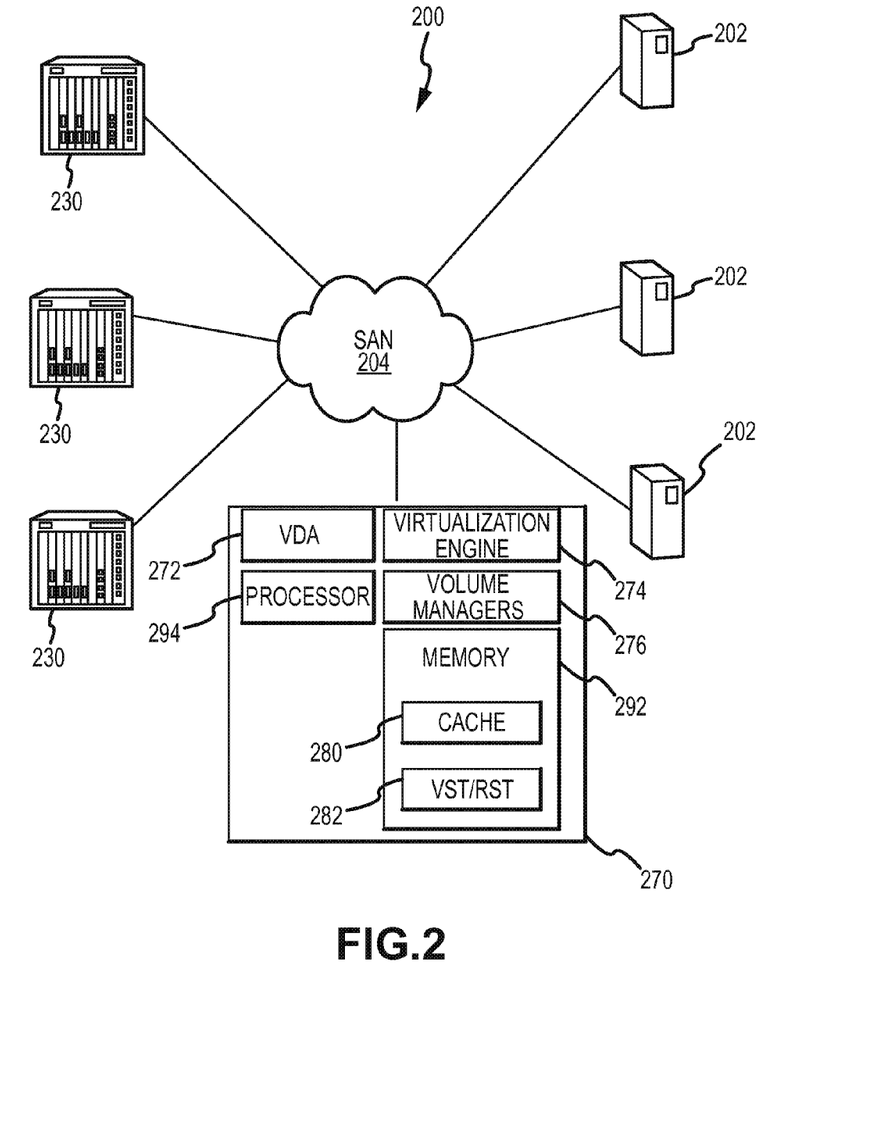
FIG. 2 illustrates an exemplary storage area network (SAN) and associated administrator device.

FIGS. 1 and 2 hereafter provide examples of computing storage environments in which the mechanisms of the following embodiments may be implemented. It should be appreciated, however, that FIGS. 1 and 2 are only exemplary and are not intended to state or imply any limitation as to the particular architectures in which the exemplary aspects of the various embodiments may be implemented. Many modifications to the architecture depicted in FIGS. 1 and 2 may be made without departing from the scope and spirit of the following description and claimed subject matter.

FIG. 1 illustrates a computer network 100 in the form of a local area network (LAN). LAN interconnection 100 may be any number of network topologies, such as Ethernet. Workstation nodes 102 are coupled to a server 120 via a LAN interconnection 104. Data storage, such as a volume 130 is coupled to the server 120. The volumes 130 may be organized in a RAID rank 140. For each volume, a number of extents 150 may be allocated. As one of ordinary skill in the art will appreciate, the volumes 130 and rank(s) 140 may be configured physically or virtually (logically).

The network shown in FIG. 1 is known as a client-server model of network. Clients are devices connected to the network that share services or other resources. A server 120 administers these services or resources. A server 120 is a computer or software program, which provides services to clients 102. Services that may be administered by a server include access to storage volumes 130, applications provided by the server 120 or other connected nodes (not shown), or printer sharing 160.

In FIG. 1, workstations 102 are clients of server 120 and share access to volumes 130 that is administered by server 120. When one of workstations 102 requires access to volumes 130, the workstation 102 submits a request to server 120 via LAN interconnect 100. Server 120 services requests for access from workstations 102 to volumes 130. One possible interconnect technology between server and storage is the traditional small computer systems interface (SCSI) interface.

As networks such as shown in FIG. 1 grow, new clients 102 may be added, more storage such as volumes 130 may be added and servicing demands may increase. As mentioned above, server 120 will service all requests for access to volumes 130. Consequently, the workload on server 120 may increase dramatically and performance may decline. To help reduce the bandwidth limitations of the traditional client server model, Storage Area Networks (SAN) have become increasingly popular in recent years. Storage Area Networks interconnect servers and storage at high speeds. By combining existing networking models, such as LANs, with Storage Area Networks, performance of the overall computer network may be improved.

FIG. 2 shows one exemplary embodiment of a SAN 200. Servers 202 are coupled to data storage devices 230 via SAN interconnect 204. Each server 202 and each storage device 230 is coupled to SAN interconnect 204. Servers 202 have direct access to any of the storage devices 230 connected to the SAN interconnect 204. SAN interconnect 204 can be a high speed interconnect, such as Fibre Channel or small computer systems interface (SCSI). In addition, SAN interconnect 204 can be an Internet Small Computers System Interface (iSCSI), a Fiber Connectivity (FICON) storage protocol, or Serial Attached SCSI (SAS) attached storage. As FIG. 2 shows, the servers 202 and storage devices 230 comprise a network in and of themselves.

In the SAN 200 of FIG. 2, no server 202 is dedicated to a particular storage device 230 as in a LAN. Any server 202 may access any storage device 230 on the SAN 200 in FIG. 2. Typical characteristics of a SAN 200 may include high bandwidth, a multitude of nodes per loop, a large connection distance, and a very large storage capacity. Consequently, the performance, flexibility, and scalability of a Fibre Channel based SAN 200 may be significantly greater than that of a typical SCSI based system.

FIG. 2 also shows a network administrator/controller 270 coupled to the SAN interconnect 204. Being able to effectively allocate storage 230 in a SAN 200 in a manner that provides for adequate data protection and recoverability is of particular importance. Because multiple hosts may have access to a particular storage array 230 in a SAN 200, prevention of unauthorized and/or untimely data access is desirable. Zoning is an example of one technique that is used to accomplish this goal. Zoning allows resources to be partitioned and managed in a controlled manner. The administrator 270 may be used to map hosts to storage and provide control to allocation of the storage devices 230.

Current storage products managed and monitored by devices such as an administrator 270 include so-called "point-in-time" copy functionality. Point-in-time copy functionality is a technology in the storage microcode that makes it possible to very rapidly provide a copy (or apparent copy) of a volume without necessarily reading all the data from the source volume and writing it to a target volume. This is done through bitmaps and algorithms which control when data must actually be moved to the target. Point in time copy functionality has provided great advantage in reducing the amount of time that source volumes must have their input/output (I/O) activity quiesced in order to produce consistent target volumes for data backup, archive, or data mining purposes.

In many applications, point-in-time copy functionality need only make a copy of data that is actually changed in the source volumes, yet until recently the entire capacity of the source volumes had to be allocated and reserved for the targets of the functionality. Recent enhancement to various point-in-time copy implementations now allow the target volumes to be much smaller that the space allocated for the source volumes, anticipating that only data that actually gets changed in the source volumes needs to be copied to the target volumes. In these cases, the target volumes are said to be "thin or thinly provisioned."

The administrator 270 may be configured to aid in the selection of storage locations within a large network of storage elements. The administrator 270 includes a storage virtualization optimizer that, according to an embodiment of the present invention, processes input/output in accordance with a customer's specified performance and space requirements, given a level of desired performance, attributes of the user's workload, the varying performance attributes of storage and its response to different types of workloads, and the presence of competing workloads within the network.

The virtual disk allocator (VDA) 272 satisfies requests for storage within the network of storage elements in such a way as to meet the performance requirements specified with the request, or through a storage policy mechanism. The virtual disk allocator 272 can operate in environments such as the IBM 2145 SAN Volume Controller (SAN VC), which is a virtualized storage subsystem. The virtual disk allocator 272 may determine performance characteristics of managed disks. The virtual disk allocator 272 may further determine relationships between managed disks and resource groups based on user defined or automated input, and create a virtual disk that includes a set of the managed disks, taking into consideration the resource groups, and the resource group storage resources such as cache and data paths, to which the managed disks are allocated.

The virtual disk allocator 272 extends the policy-based aspects to Open System Environments and automates the selection of storage elements within virtualized storage subsystems to meet performance requirements. Recommending the selected storage elements within the virtualized storage system allows for optimal usage of striped or composite volumes supported by the OS or Volume Manager software, or applications (such as database applications) which support the concept of striped volumes, such as DB2 and other database products. The virtual disk allocator 272 also extends the notions of allocating storage taking into consideration long-term data usage patterns. The virtual disk allocator 272 incorporates various algorithms required to make intelligent choice of data placement.

The virtual disk allocator 272 may make determinations of which nodes, i.e., engines such as the virtualization engine 274, may access the data, and which managed disk groups (MDGs), groups of disks supporting a virtual disk, would compose the logical disks (LUNs) to be selected. Within the MDG is at least one managed disk, which is used by a virtualization engine 274 and volume manager 276 to stripe data within the virtual disk, which is comparable to logical disks in Enterprise Storage Systems (ESS). The virtual disk allocator 272 can thus select a LUN or a plurality of LUNs in multiple resource groups across multiple storage elements in order to meet the customer's desired level of performance. A virtualization engine 274 and volume manager 276 may be used to stripe data within a virtual disk across managed disks. The virtualization optimizer may make determinations of which nodes, i.e., engines such as the virtualization engine 274, may access the data, and which managed disk groups (groups of disks) would compose the LUNs to be selected. An additional important application of this would be to use the virtualization optimizer to determine how to relocate, e.g., nodes or managed disk groups, the LUNs, i.e., virtual disks, to meet the customer's desired level of performance.

Administrator 270 is shown including a memory module 292 and a processor 294. Processor 294, along with other components such as VDA 272 and others, may execute instructions to perform various mechanisms of the illustrated embodiments as will be further illustrated. The instructions to implement these mechanisms or performance data processed by these mechanisms may be stored in memory module 292. Memory module 292 includes a cache 280 and a volume segment table/rank segment table (VST/RST) 282. Memory 292 may, as one of ordinary skill in the art will appreciate, be physically located apart from administrator 270. Memory 292 may include a non-volatile storage (NVS) device having a battery or system disk backup.

Figure 3:
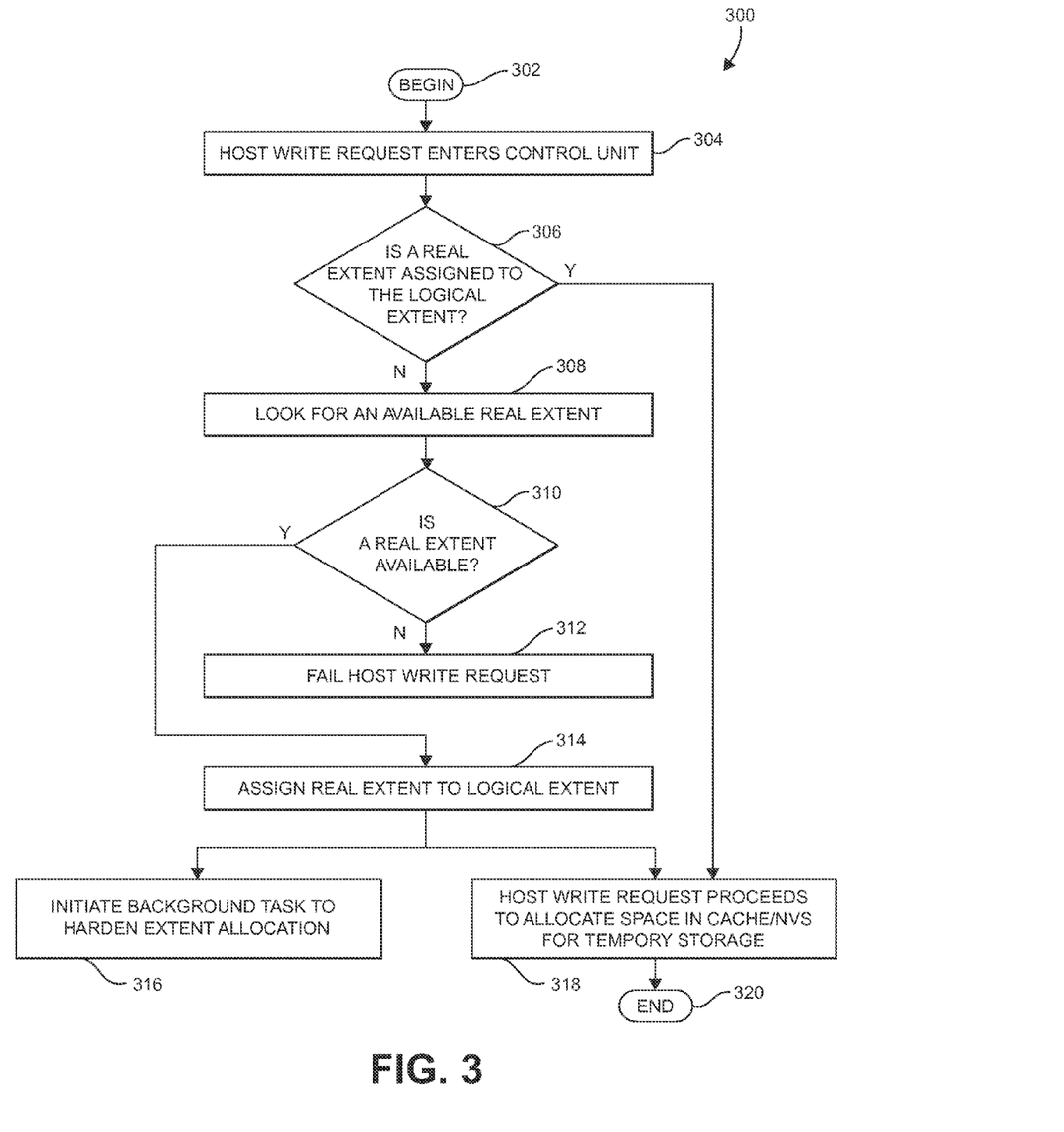
FIG. 3 illustrates a first exemplary method for allocating extents in a thinly provisioned computer storage environment such as a SAN.
Figure 4:
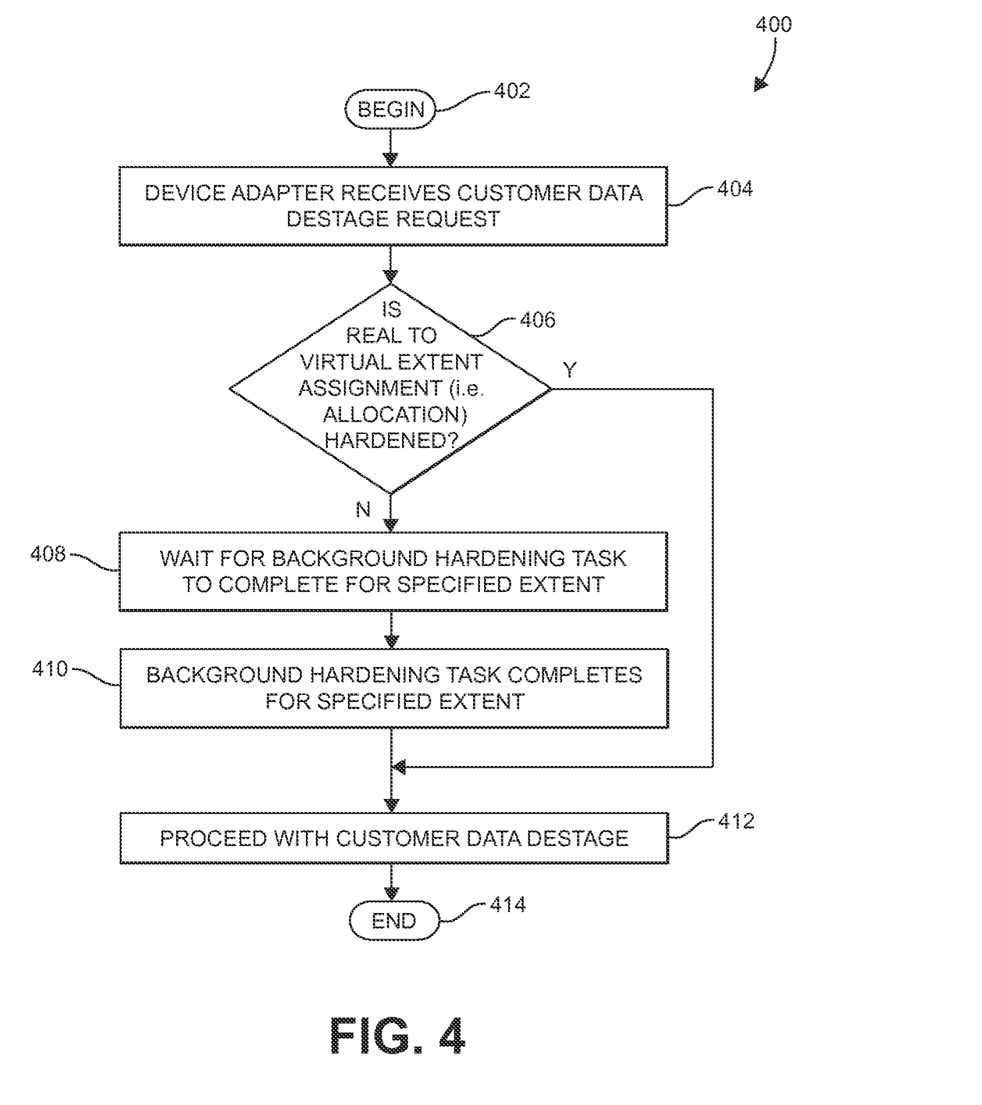
FIG. 4 illustrates a second exemplary method for allocating extents in a thinly provisioned computer storage environment.

Turning now to FIG. 3, a first exemplary method 300 for allocation of extents in a thinly provisioned computing storage environment is depicted. The method 300 illustrates various mechanisms of the present invention as previously described. FIG. 4 illustrates an additional exemplary method 400 in this same regard. As one skilled in the art will appreciate, various steps in the methods 300 and 400 may be implemented in differing ways to suit a particular application. In addition, the described methods may be implemented by various means, such as hardware, software, firmware, or a combination thereof operational on or otherwise associated with the storage environment. For example, the methods may be implemented as a computer program product including a computer-readable storage medium having computer-readable program code portions stored therein. The computer-readable storage medium may include disk drives, flash memory, digital versatile disks (DVDs), compact disks (CDs), and other types of storage mediums.

The method 300 of FIG. 3 begins (step 302) by a host write command entering a control unit in the computing storage environment (step 304) for a particular logical extent. Pursuant to the host write command, data is instructed to be written from the host to a storage unit, for example. Subsequent to the issuance of the host write command, the method 300 queries whether a "real" or physical extent is assigned to the logical extent (step 306). If not, the method then determines if a real extent is available to be assigned (step 308). If a real extent is available (step 310), the real extent is assigned, or allocated, to the logical extent (step 312). This allocation is performed by updating the system metadata associated with the logical extent. If not, the method 300 fails the host write request (step 314). By failing the host write request before the cache or NVS is filled with data, overall performance and efficiency of the computing storage environment is thereby increased.

Following successful assignment of the real extent to the logical extent (again, step 312), the method 300 initiates a background task to harden the extent allocation (step 316), while pursuant to the host write request, space is allocated in the cache and/or NVS for temporary storage (step 318). The method 300 then ends (step 320). Returning to step 306, if the method determines that a real extent is already assigned to the logical extent, the method 300 continues to step 318 as previously described. The method 300 ends (again, step 320).

In alternative embodiments, method 300 may initiate alternative processes to harden the extent allocation shown in step 316. For example, the method 300 may place a higher priority on the extent allocation hardening than initiating a background process, such as initiating the extent allocation hardening as a foreground-type task.

Turning now to FIG. 4, method 400 continues the extent allocation and data movement processes previously initiated in FIG. 3 pursuant to method 300. Method 400 begins (step 402) with a request received by a device adapter in the computing storage environment associated with a storage device to perform a destage operation (step 404). The method 400 then queries if the virtual to real extent assignment (again, e.g., allocation) performed in step 312 (FIG. 3) has been hardened (step 406). If not, the method 400 waits for the background hardening task initiated in step 316 (again, FIG. 3) to complete for the specified extent (step 408).

Once the background hardening task for the specified extent completes (step 410), the method moves to step 412, where the underlying customer data destage operation proceeds. The method 400 then ends (step 414).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for allocating a plurality of extents in a thinly provisioned computing storage environment, comprising:
   subsequent to a write request and previous to entering a cache of the computing storage environment, determining, for a logical extent, whether a real extent is available;
   if the real extent is available, pursuant to determining the availability of the real extent:
   allocating the logical extent to the real extent by updating system metadata associated with the logical extent,
   subsequent to allocating the logical extent to the real extent, hardening the updated system metadata while allocating space in the cache for data associated with the write request, and
   after the hardening of the undated system metadata, destaging the data associated with the write request from the cache to a disk; and
   if the real extent is not available, pursuant to determining the availability of the real extent, failing the write request.

2. The method of claim 1, further including, previous to determining the availability of the real extent, determining if the real extent is assigned to the logical extent, wherein if the real extent is not assigned to the logical extent, locating an available real extent in a storage pool in the thinly-provisioned computing storage environment, and assigning the available real extent the logical extent.

3. The method of claim 1, wherein hardening the updated system metadata is performed by initiating a background task.

4. The method of claim 1, further including, previous to destaging the data associated with the write request to the allocated real extent, determining if the updated system metadata has been hardened, wherein if the updated system metadata has not been hardened, waiting for the background task to harden the updated system metadata to complete.

5. The method of claim 1, wherein allocating the logical extent to the real extent by updating system metadata associated with the logical extent is first performed for at least one of a plurality of volatile extent allocations.

6. The method of claim 5, further including, if allocating the logical extent to the real extent performed for the at least one of the plurality of volatile extent allocations has completed, allocating the logical extent to the real extent for at least one of a plurality of non-volatile extent allocations.

7. A system for allocating a plurality of extents in a thinly provisioned computing storage environment, comprising:
a processor operational within the thinly-provisioned computing storage environment, wherein the processor is adapted for:
subsequent to a write request and previous to entering a cache of the computing storage environment, determining, for a logical extent, whether a real extent is available,
if the real extent is available, pursuant to determining the availability of the real extent:
allocating the logical extent to the real extent by updating system metadata associated with the logical extent,
subsequent to allocating the logical extent to the real extent, hardening the updated system metadata while allocating space in the cache for data associated with the write request, and
after the hardening of the updated system metadata, destaging the data associated with the write request from the cache to a disk; and
if the real extent is not available, pursuant to determining the availability of the real extent, failing the write request.

8. The system of claim 7, wherein the processor is further adapted for, previous to determining the availability of the real extent, determining if the real extent is assigned to the logical extent, wherein if the real extent is not assigned to the logical extent, locating an available real extent in a storage pool in the thinly-provisioned computing storage environment, and assigning the available real extent the logical extent.

9. The system of claim 7, wherein the processor is further adapted for initiating a background task to harden the updated system metadata.

10. The system of claim 7, wherein the processor is further adapted for, previous to destaging the data associated with the write request to the allocated real extent, determining if the updated system metadata has been hardened, wherein if the updated system metadata has not been hardened, waiting for the background task to harden the updated system metadata to complete.

11. A computer program product for allocating a plurality of extents in a thinly provisioned computing storage environment, the computer program product comprising a non-transitory computer-readable storage medium having computer-readable program code portions stored therein, the computer-readable program code portions comprising:
a first executable portion for, subsequent to a write request and previous to entering a cache of the computing storage environment, determining, for a logical extent, whether a real extent is available;
a second executable portion for, if the real extent is available, pursuant to determining the availability of the real extent, allocating the logical extent to the real extent by updating system metadata associated with the logical extent, subsequent to allocating the logical extent to the real extent, hardening the updated system metadata while allocating space in the cache for data associated with the write request, and after the hardening of the updated system metadata, destaging the data associated with the write request from the cache to a disk; and
a third executable portion for if the real extent is not available, pursuant to determining the availability of the real extent, failing the write request.

12. The computer program product of claim 11, further including a fourth executable portion for, previous to determining the availability of the real extent, determining if the real extent is assigned to the logical extent, wherein if the real extent is not assigned to the logical extent, locating an available real extent in a storage pool in the thinly-provisioned computing storage environment, and assigning the available real extent the logical extent.

13. The computer program product of claim 11, further including a fourth executable portion for, pursuant to hardening the updated system metadata, initiating a background task.

14. The computer program product of claim 11, further including a fifth executable portion for, previous to destaging the data associated with the write request to the allocated real extent, determining if the updated system metadata has been hardened, wherein if the updated system metadata has not been hardened, waiting for the background task to harden the updated system metadata to complete.

* * * * *